(12) United States Patent
Bozinovic et al.

(10) Patent No.: US 11,321,568 B1
(45) Date of Patent: May 3, 2022

(54) METHOD FOR REAL-TIME INTEGRATED T+2D DWT VIDEO COMPRESSION AND LOW-LEVEL VIDEO ANALYSIS WITHIN AN INTELLIGENT CAMERA OPTIONALLY EMBEDDED IN AN END-TO-END AAL SYSTEM

(71) Applicants: Radmilo Bozinovic, San Jose, CA (US); Isaak E. Van Kempen, Fremont, CA (US)

(72) Inventors: Radmilo Bozinovic, San Jose, CA (US); Isaak E. Van Kempen, Fremont, CA (US)

(73) Assignee: EVES Technology, Inc., San Jose, CA (US)

( * ) Notice: Subject to any disclaimer, the term of this patent is extended or adjusted under 35 U.S.C. 154(b) by 163 days.

(21) Appl. No.: 16/653,902

(22) Filed: Oct. 15, 2019

Related U.S. Application Data

(60) Provisional application No. 62/746,483, filed on Oct. 16, 2018.

(51) Int. Cl.
*G06K 9/00* (2006.01)
*H04N 19/136* (2014.01)
*G06N 3/08* (2006.01)

(52) U.S. Cl.
CPC ..... *G06K 9/00718* (2013.01); *G06K 9/00348* (2013.01); *G06N 3/08* (2013.01); *H04N 19/136* (2014.11); *G06K 2009/00738* (2013.01)

(58) Field of Classification Search
CPC .......... G06K 9/00718; G06K 9/00348; G06K 2009/00738; G06N 3/08; H04N 19/136
See application file for complete search history.

(56) References Cited

U.S. PATENT DOCUMENTS

| | | | |
|---|---|---|---|
| 9,336,456 B2* | 5/2016 | DeLean | G06K 9/6201 |
| 10,567,771 B2* | 2/2020 | Mishra | H04N 19/20 |
| 2005/0286786 A1* | 12/2005 | Noda | H04N 19/61 |
| | | | 382/239 |
| 2007/0013776 A1* | 1/2007 | Venetianer | H04N 7/181 |
| | | | 348/143 |
| 2008/0291996 A1* | 11/2008 | Pateux | H04N 19/154 |
| | | | 375/240.11 |
| 2009/0189981 A1* | 7/2009 | Siann | H04N 7/188 |
| | | | 348/143 |
| 2010/0289897 A1* | 11/2010 | Arai | G06K 9/3258 |
| | | | 348/148 |
| 2018/0025231 A1* | 1/2018 | Noh | G06K 9/6201 |
| | | | 382/160 |

* cited by examiner

*Primary Examiner* — Dhaval V Patel
(74) *Attorney, Agent, or Firm* — Law Office of David Hong

(57) ABSTRACT

A method and apparatus to analyze video data comprising: using a camera with a computing device with a memory storage and a power source to capture and to store the video data; simultaneously compressing and analyzing said video data using Low Level Analysis of contours of static and moving objects within the video data; said compression can be wavelet-based decomposition; and said analysis of the video data compares real-time semantic human activity within the video data, whereby the method identifies the specific human activity within the video data; the camera can be wirelessly connected to a base station and communicates through 2-way full duplex connection.

20 Claims, 9 Drawing Sheets

Fig. 3

| Module | Selected | Comment |
|---|---|---|
| AAA module | Freeradius server | • Established open-source offering<br>• Simple to deploy and manage |
| Deployment environment | AWS Cloud<br>• Leader in cloud services, globally available<br>• Functionality – AWS has all the services required | • Cost – POC and pilot can be implemented using free tier services at almost no cost<br>• Provides reliable, extensible, high-availability deployments |
| Eyestech Application | Python Flask module | |
| Big Data Engine | Unicage?<br>• Secure and efficient big data processing, anywhere | Other options<br>• AWS big data services<br>• ElasticSearch and Kibana |

| Item | Implementation | Location | Comment |
|---|---|---|---|
| Freeradius | Runs as a service >sudo service freeradius status | Configuration /etc/freeradius/ | Restarts automatically at reboot |
| Eyestech app | Runs as a service >sudo service eyestech status | Service configuration >/lib/systemd/system$ sudo cat eyestech.service | Restarts automatically at reboot |
| Eyestech app | Business logic implemented via python Flask module | /home/ubuntu/github/eyestech/network_server/eyestech.py | |
| Eyestech -- directories for uploaded data files | | /mnt/efs/eystech/<base_station> | |
| Eystech app log file | | /var/log/eystech | |
| Retention time for uploaded data files | >sudo crontab -l | /usr/local/bin/eyestech-retention.sh | Retention is set for 1 day |

Fig. 5

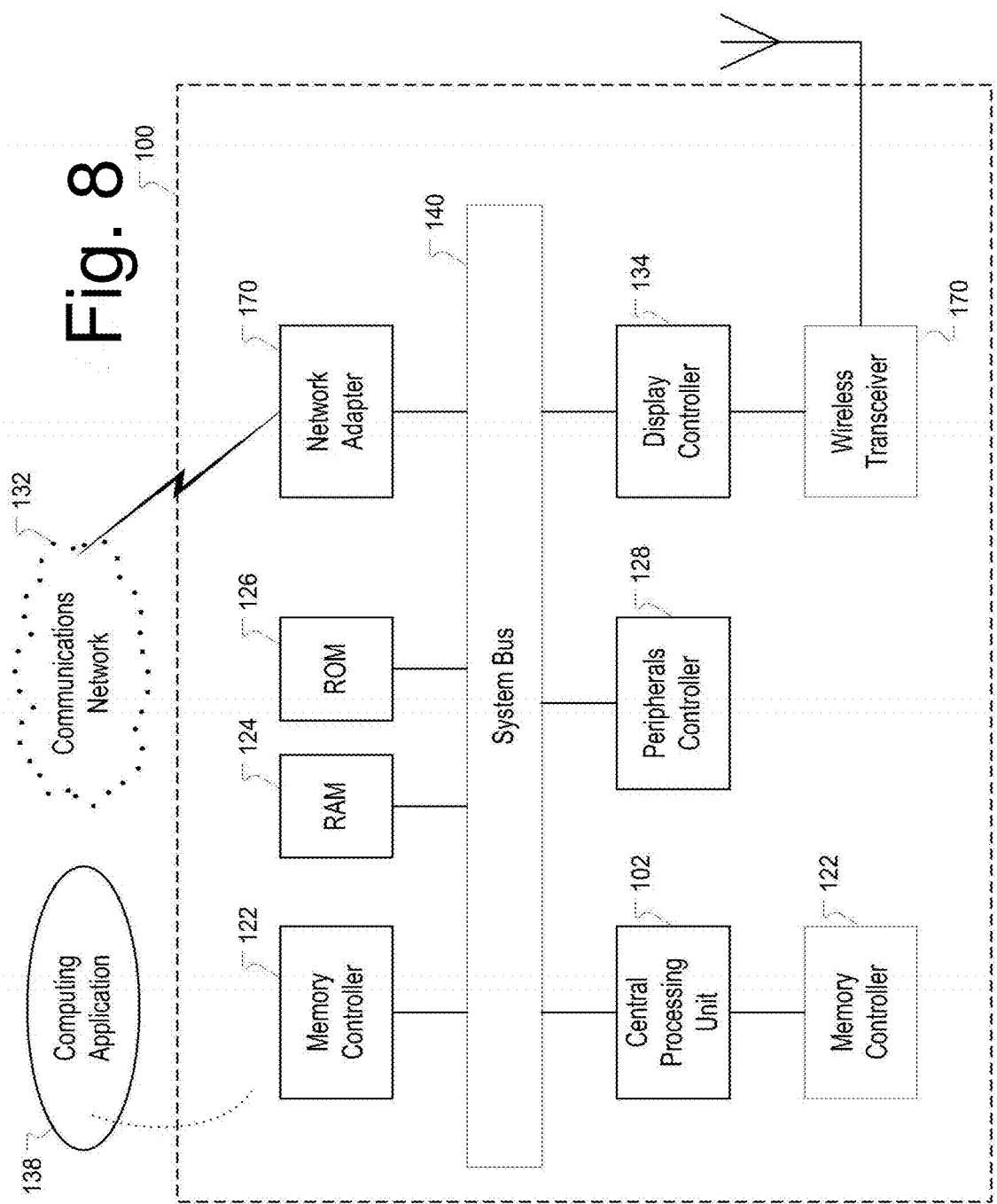

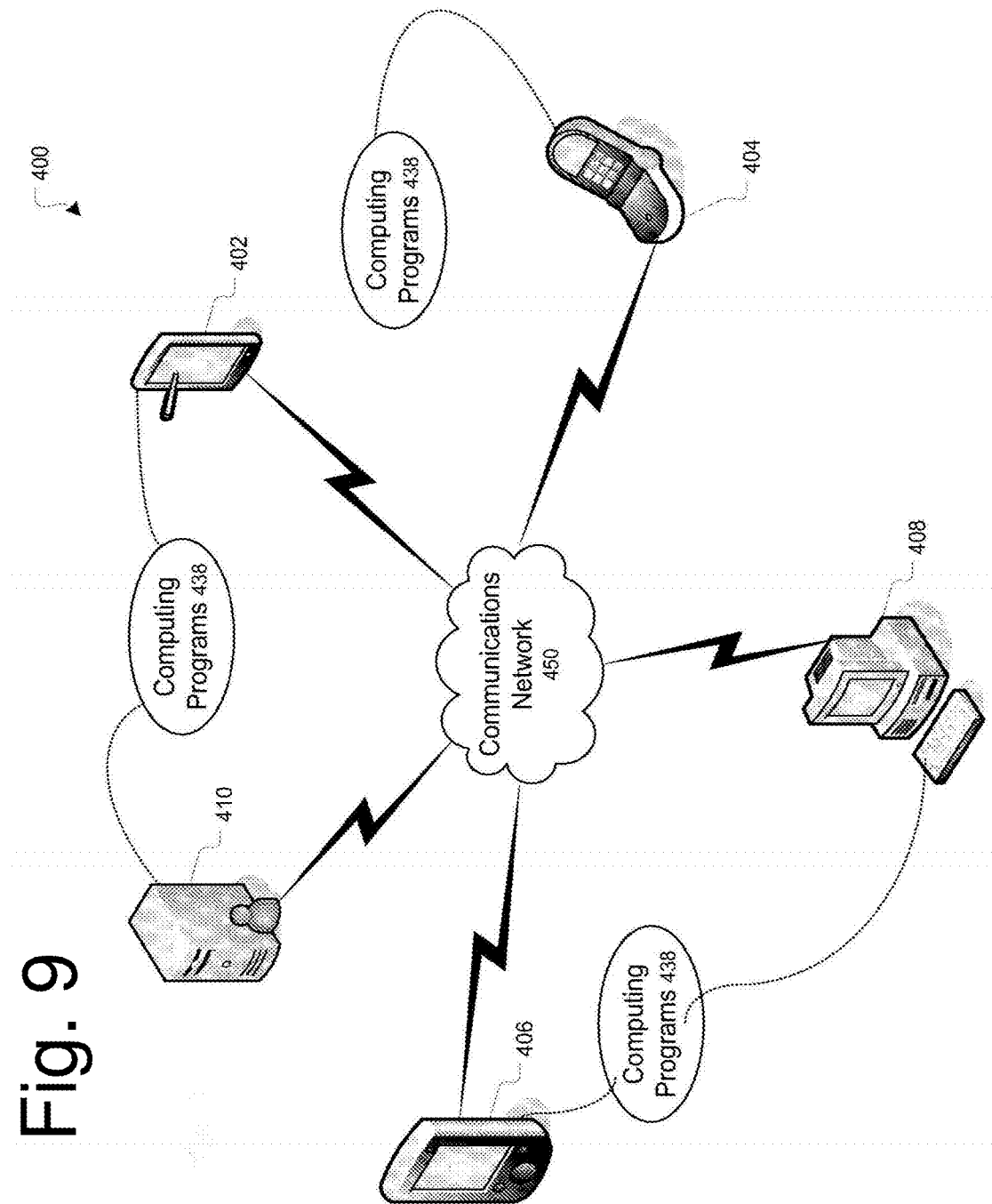

METHOD FOR REAL-TIME INTEGRATED T+2D DWT VIDEO COMPRESSION AND LOW-LEVEL VIDEO ANALYSIS WITHIN AN INTELLIGENT CAMERA OPTIONALLY EMBEDDED IN AN END-TO-END AAL SYSTEM

PRIORITY CLAIM

This application claims the benefit of U.S. Provisional Patent Application No. 62/746,483, filed on Oct. 16, 2018, which is incorporated by reference in entirety.

FIELD OF INVENTION

Improvement for integrating video compression and low-level video analysis.

DESCRIPTION OF RELATED ART

Vast amounts of video data are produced daily from a broad range of devices on an unprecedented scale, regardless of whether interpretation of this information is required in real time. Not only is the volume of data rapidly growing, but also the variety (range of data types, resolutions, sources) and velocity (rate of capture and transmission), leading to the well known "3 Vs of Big Data", originally formulated by Gartner. While some level of real-time automated video analysis has become widespread in order to facilitate useful processing of this data, there still remains a huge gap and thus growth potential in surveillance, automotive, robotics, medical/wellness, etc. Though diverse in appearance, all these areas share some key challenges and requirements—often coalesced into broader emerging paradigms such as Ambient Intelligence (AmI), Ambient Assisted Living (AAS), Aging in Place (AiP), Smart Surveillance, etc.—and are likely to utilize the same basic platforms.

For reasons ranging from practical to legal, it is widely accepted that most automated surveillance/monitoring must be backed by original (possibly compressed) video footage. However, effective real-time compression of the mentioned exponentially growing variety/volume of video remains a problem, since dominant standard codecs (H.26x) were generally designed with different (broadcast) requirements and cannot be optimally integrated in this context, despite a growing understanding of this problem (e.g. IEEE 1857/ AVS standard modification attempts). Furthermore, it is well known that video analysis in the compressed domain is inherently hard, and likewise any subsequent video analytics down the processing chain (e.g., "in the cloud") must endure the expensive and impractical codec cycle. Along with continuing pressure to reduce the weight and power requirements of capture devices, this defines the main current challenges to wider adoption of automated real-time video analysis. As summarized in "Human Activity Analysis: A Review" from Computing Surveys 43(3): "In order for an activity recognition methodology to be applicable for real-world applications, including surveillance systems, human-computer interfaces, intelligent robots, and autonomous vehicles, this computational gap must be overcome." Therefore, one way to reduce this bottleneck is by optimally mapping key video analysis methods (generally well-understood by now in terms of design and tradeoffs) onto ongoing general hardware improvements (e.g. multi-core CPUs, GPGPUs, specialized hardware), and specifically—to integrate video analysis and compression as tightly and as early in the processing chain as possible.

Such an approach is further supported by the twin challenges of privacy and security, which suggest eliminating full video—regardless of any compression and encryption—from most of the public network (as well as workflow processing chain), whenever possible, and general analysis goals are known beforehand. All this then practically supports the need to try and keep integrated compression+ analysis processing at the "head end" (i.e. intelligent camera), with its output forked thus: compressed full video (of duration limited by available memory) stored locally on camera, and low-bandwidth filtered essential information (e.g. video pre-processed for optimal recognition, indexing and retrieval) passed along. Rather than achieving data reduction by focusing merely on mathematical redundancy, here non-essential information is stripped away, enabling a kind of "semantic compression" that achieves both goals at once.

Finally, it should be stressed that advantages of such an approach are not limited to applications requiring real-time video analysis—rather, they can enhance the utility of Big Data at large. This is dictated by the confluence of these factors: a) the mentioned huge and rising volume of fresh video material generated daily; b) the need for video indexing and retrieval methods to effectively manage, store and use such volume/variety of material; c) the fact that applying a level of video indexing at the source, jointly with compression and analysis, should greatly simplify any further offline retrieval effort. From the 2012 Springer Briefs book "*Visual Indexing and Retrieval*": "The areas of societal activity such as video surveillance and security also generate thousands of terabytes of video content with specific issues to be tackled. [ . . . ] Thus, visual information indexing and retrieval has attracted a lot of research efforts since the early nineties. However nowadays, owing to the size of large scale databases, complexity of visual interpretation tasks, the famous 'semantic gap' between the (semantic) concept(s) the user is looking for in images and the digital representation of the (semantic) visual content, the research directions are widely open." Therefore, integrating some level of visual analysis at the point of video capture and compression allows to reduce this semantic gap while simultaneously mitigating challenges of the "3 Vs" information bottleneck. Concurrently, such an approach effectively implements the "edge computing" paradigm, thus justifying its succinct summary from an authoritative survey paper, whereby "the rationale of edge computing is that computing should happen at the proximity of data sources" (Shi et al.: Edge Computing Vision and Challenges, *IEEE IoT Journal, Vol. 3, No. 5, October 2016*) and fulfilling one its key benefits on "data abstraction", whereby "data should be preprocessed at the gateway level, such as noise/low-quality removal, event detection, and privacy protection, and so on".

The present invention describes a method to optimally integrate two hitherto separate and sequentially performed operations: compression and low-level analysis of video. This method is embedded in a camera subsystem, designed to facilitate certain real-time semantic human activity recognition and communication with remote portable device users. In one embodiment—presented as the main illustration of the invention's practical applicability—these users would be remote family member caregivers or healthcare providers, in turn as part of a broader AAL system that enables AiP of elderly subjects monitored. However, the invention is not limited to such a specific use, and other embodiments can be envisaged, e.g. smart surveillance for security applications, in which case Events of Interest (EOI, see component 500 in invention disclosure below) could alternatively involve the detection of: intrusion/trespassing (unauthorized or otherwise suspicious personnel in restricted areas); tailgating (illegal follow-through at controlled access points); suspicious objects (unattended items deposited in a sensitive area beyond a predefined limit); loitering (persons identified in a controlled area for an extended time period); possibly other select predefined anomalous activity (e.g. violent physical contact, persons lying on the ground).

As suggested earlier, the present invention consequently embodies aspects of the edge computing paradigm, along with elements of edge analytics and cloudlet functionality (e.g., see M. Satyanarayanan: The Emergence of Edge Computing, *IEEE Computer,* 2017)

The present invention introduces such refinements. In its preferred embodiments, the present invention has several aspects or facets that can be used independently, although they are preferably employed together to optimize their benefits. All of the foregoing operational principles and advantages of the present invention will be more fully appreciated upon consideration of the following detailed description, with reference to the drawings.

SUMMARY OF THE INVENTION

This invention presents a method and apparatus that integrates video compression and low-level video analysis to determine specific behavior of people. Such apparatus can operate autonomously in a broad range of applications that require real-time automated analysis of human activity backed by original footage and coupled with considerations of privacy and security. In one (preferred) embodiment, it is part of a broader system of Ambient Assisted Living (AAL), serving as a client module for monitoring wellness and activities of aging-in-place (AiP) seniors, and coupled with a network server. The purpose of such network server is to host back-end modules (big blocks), which include an authentication, authorization and accounting (AAA) server, the applicant's application and Big-Data processing, thus providing reliable, extensible, high-availability deployment, which is simple to monitor and manage. This embodiment selects and employs modules to accommodate the applicant's basic data flow, which includes: user registration, authentication, authorization and accounting, facilitates secure uploading, management and archiving of user data files and performs Big-Data processing on uploaded data files per business requirements of the remotely connected users.

As shown in FIG. 2, in an overview of the Data Sequence, (1) users and their associated base station (BS) are registered with the AAA server; (2) the BS sends processed video data files to the back-end processing; (3) each file upload request is authenticated by the AAA server; (4) User Data is processed by the Big-Data Engine (in one preferred embodiment, the Big-Data runs an Extract-Transform-Load (ETL) process on users data and preps data in format as required by business logic so that it can be displayed at the Users Dashboard); (5) the dashboard presents processed data via data visualization software.

The applicant's network server application can have the following main functions: (1) Interface with AAA server to register and manage users and base stations (clients); (2) Upload, store and manage data files from registered base stations; (3) Enable registered users to log in and view data files/statistics/metrics from mapped base stations; (4) Provide following administrative functions: Add new users and register them with AAA server; Add new clients (base stations) and register them with AAA server; Provide method to map users to base stations; (one-to-one, on-to-many and many-to-many); Provide ability to view upload directories; Provide logging for all server actions; Enable defining retention time for uploaded files.

BRIEF DESCRIPTION OF THE DRAWINGS

FIG. 3 shows a chart with an Initial Deployment Proposed Technology Stack;

Figure 6:
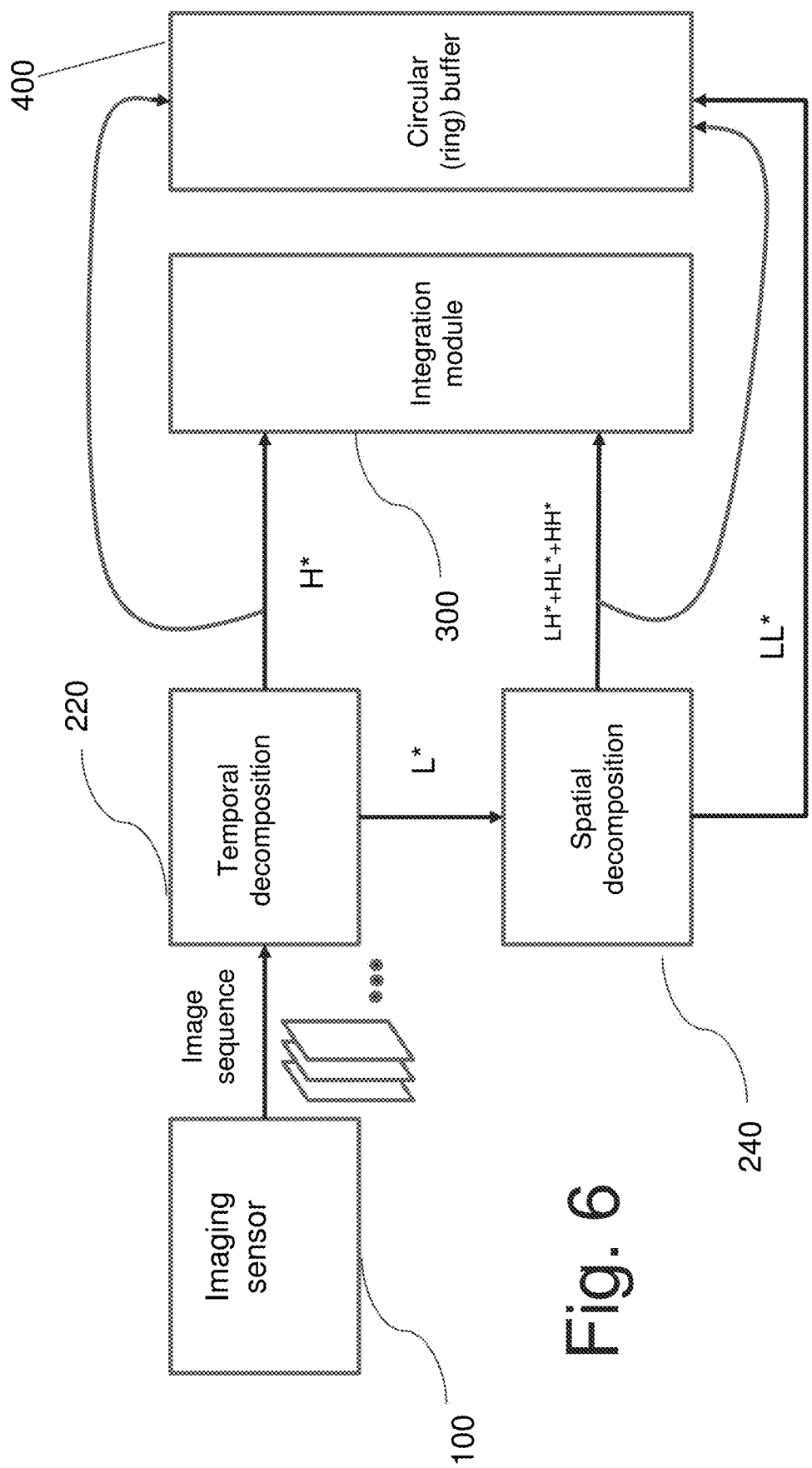
Figure 7:
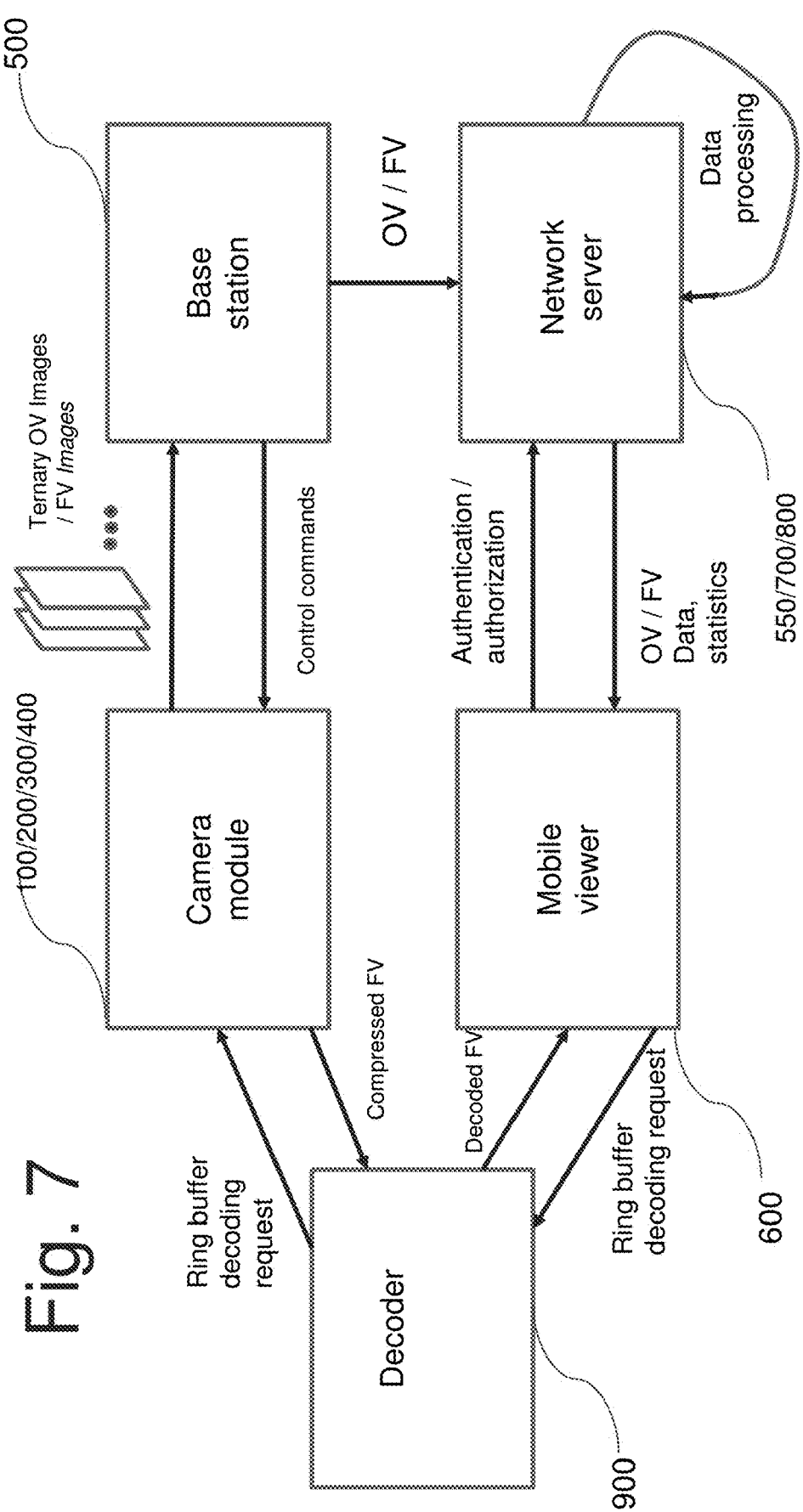

AWS—Amazon Web Services; VPC—Virtual Private Cloud;

EC2—Elastic Compute Cloud—AWS Server;

EFS—Elastic File Storage; RDS—Relational Database Service;

ELB—Elastic Load Balancer;

FIG. 5 shows a chart with Basic Deployment Facts;

FIG. 6 shows an overview of the camera module performing simultaneous compression and low-level video analysis by piping data from an imaging sensor first through both temporal and spatial decomposition, and subsequent processing;

FIG. 7 shows an overview of a preferred embodiment of the invention with the camera module, base station, network server and decoder;

FIG. 8 shows an overview diagram of a computing system connecting to a network server;

FIG. 9 shows an overview diagram of a computing system with a communication network.

DETAILED DESCRIPTION

First Embodiment

The present invention describes a camera apparatus ("camera module"—CM) with the ability to emit/stream Outline Video (OV; here understood to mean a ternary gray-level image displaying: /flat backgrounds; /outlines of static objects; /outlines of moving objects; /each at a different gray level) while simultaneously recording a compressed version of Full Video (FV) in its available internal memory buffer). This is achieved by a method that optimally integrates ("conceptually in a single operation") two hitherto separate and sequentially performed operations related to video processing: compression and low-level analysis (concretely—contour extraction/edge detection). Specifically, it employs elements of a known class of video compression methods (wavelet-based decomposition, aka DWT)—normally used solely for the purposes of coding/compression of video signal—simultaneously in the workflow of video analysis and recognition.

The camera module (CM) can be multiple units or any audio and video input or data gathering device. The stand-alone quality (and utility) of this embodiment stems from the Outline Video being both human perceptible and meaningful (apart from being input and first stage of possible further processing, to which it can organically blended). Additionally, the utility of having Outline Video alone made available to users is practically justified for certain applications, specifically those where considerations of privacy and security are important. Further, nothing in this description conceptually precludes the Camera Module from streaming Full Video instead of Outline Video.

Second Embodiment

There can be multiple or at least one Camera Module (CM) as described above, coupled with a base station (BS), communicating through a 2-way (full duplex) connection, comprising a client subsystem. In the main direction flow (CM→BS) the usual content is Outline Video, which is used on Base Station as a first step in a broad range of real-time semantic human activity recognition. Upon detection of certain predefined Events of Interest (EOI—e.g. fall detection), occurs reverse BS→CM (singular) communication, which signals to the CM to switch from OV to FV transmission. The CM←→BS connection can be wireless (Wi Fi LAN) or through a wired or other wireless communication connection.

There is a broad range of human activity recognition options here (some of them listed in the provisional application, for illustration purposes, and with fall detection practically the one of most interest to us in the Third Embodiment). There can be more than one Camera Module or multiple video data input devices connected to a single Base Station.

Third Embodiment

An overall Ambient Assisted Living (AAS) system intended to facilitate Aging in Place (AiP) comprising, in addition to the client subsystem integrating CM and BS as described above, a network server (NS) and at least one or multiple mobile viewers (MV). Here, the actual real-time semantic human activity would primarily be the "activities of daily living" (ADS) of elderly subjects in their homes, in addition to detection of specific EOIs (e.g. life-threatening human falls) mentioned in the Second Embodiment.

The network server provides basic authentication, authorization and accounting (AAA) functions for registered users and Base Stations, hosts data analysis modules and presents content to these users. Mobile viewers are applications hosted on remotely connected (broadband or cellular network) mobile devices, available to registered users (e.g. family members or healthcare providers), acting in the capacity of caregivers within a broader system that enables safe Aging in Place of elderly subjects monitored. These mobile viewers provide access to live Outline Video (Full Video in case of Event of Interest (EOI) is detected) as well an informational dashboard of statistics/trends. In case of EDI detection by a Base Station, all registered users' Mobile Viewers are immediately notified, and Full Video streaming is made available. There can be multiple base stations, camera modules and mobile viewers, even with a single network server (NS); NS functionality can be elaborated in various ways, including simple or complex configurations. There is useful information other than basic ADLs and EOIs that is to be transmitted from BS to NS for long-term ("big data") analysis of baselines, trends and changes—e.g. ambulation, gait, stoop of the subject resident or patients.

Imaging sensor, generating in sequence 2D raster images (color or grayscale) of some fixed frequency (in practice, no less than 10-12 fps)

Figure 1:
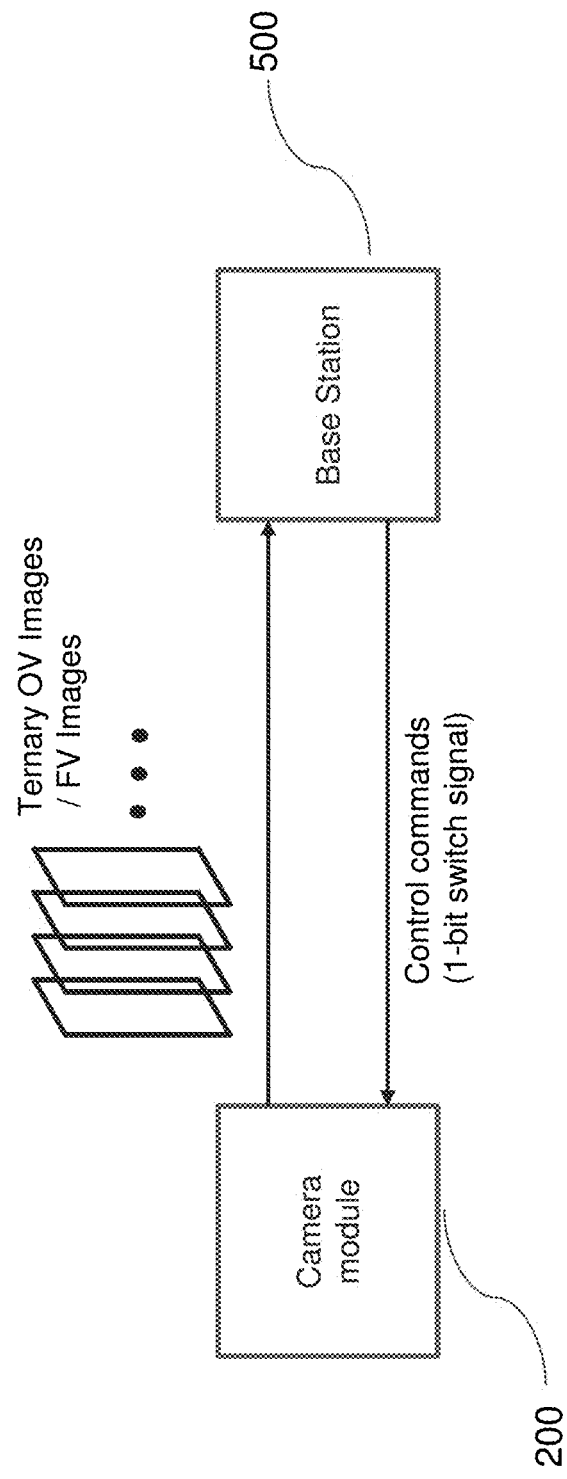
FIG. 1 shows a client subsystem, consisting of a camera module which captures outline or full video data and is connected to a base station.
Figure 2:
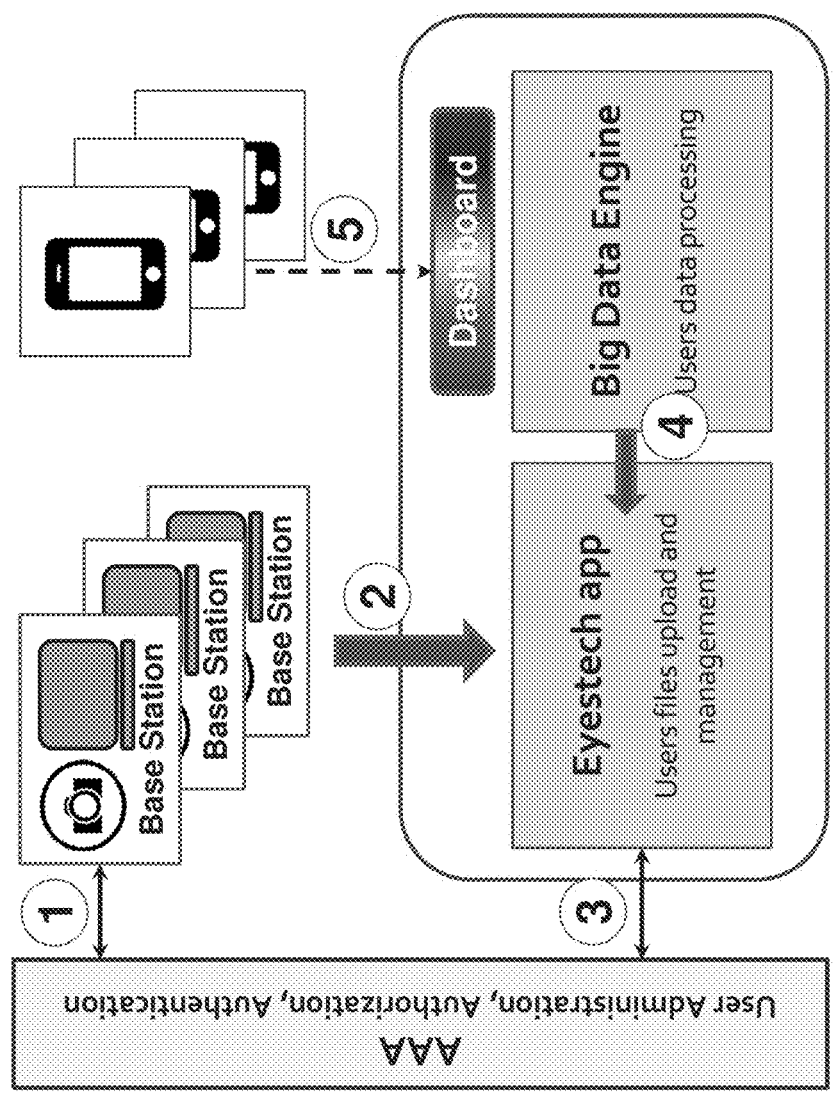
FIG. 2 shows one preferred embodiment of the data sequence.
Figure 4:
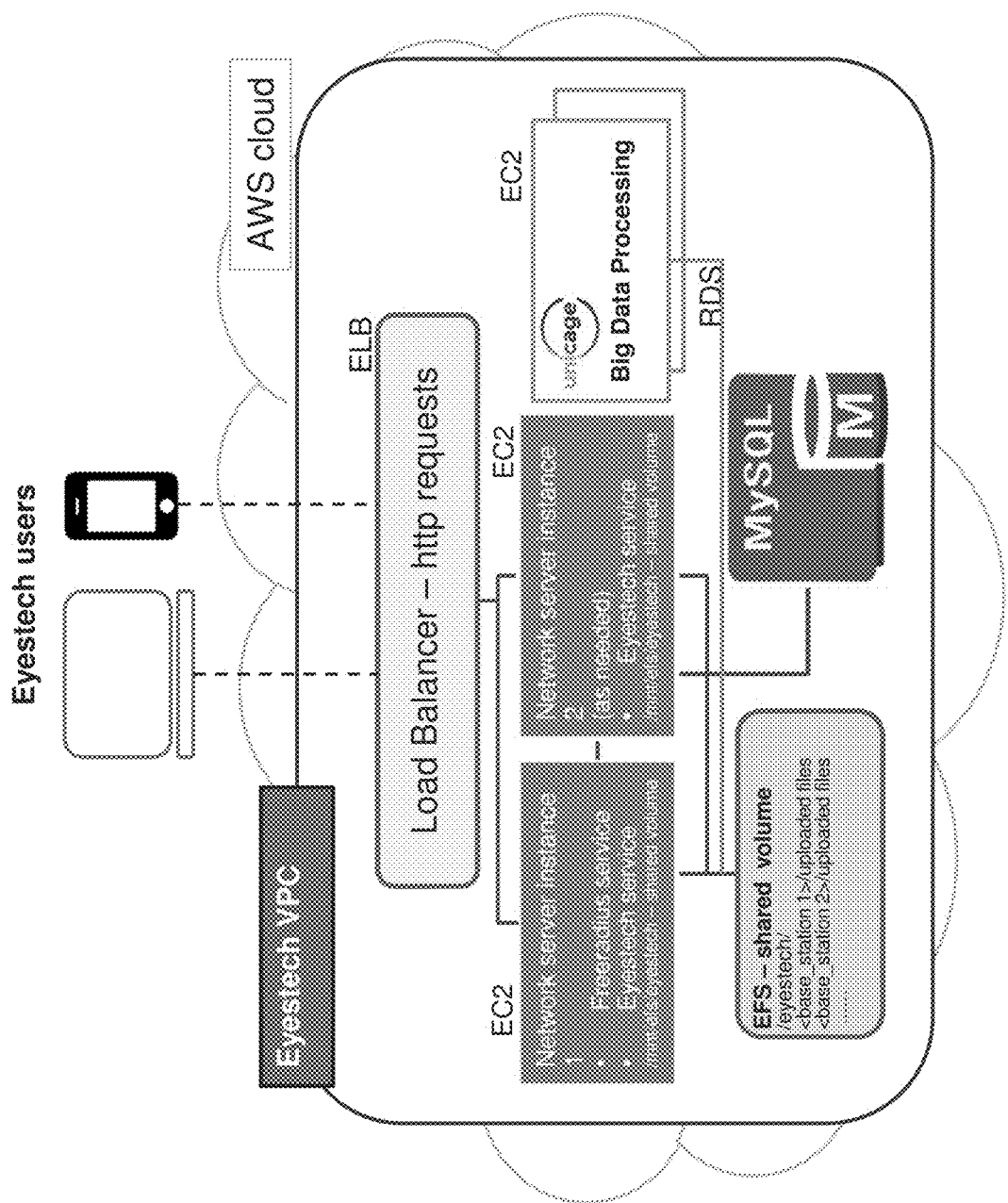
FIG. 4 shows a Network Server Deployment Diagram; Terms and Acronyms.

Image processor (functionally part of a camera module and physically included in the camera housing, in one embodiment implemented as a general purpose CPU/GPU with memory and appropriate software loaded) that cumulatively performs the "t+2D" spatiotemporal decomposition (alternatively: DWT-based dyadic decomposition/compression) by performing separately the following two decompositions in sequence: temporal and spatial. Such methods are generally known and available to one skilled in the art (e.g. as disclosed in: Jens-Rainer Ohm, Mihaela van der Schaar, John W. Woods: "Interframe wavelet coding—motion picture representation for universal scalability", *Signal Processing: Image Communication* 19 (2004), pp. 877-908; specifically, their FIG. 1 gives a clear illustration of a spatio-temporal wavelet decomposition using T=3 levels of a temporal wavelet tree); and G. Karlsson, M. Vetterli: Subband coding of video signals for packet switched networks, *Proc. Visual Commun. Image Process.* 845 (1987) pp. 446-456).

Unit that first performs the temporal part of the "t+2D" decomposition based on a memorized sequence of previous images/frames, over T levels: in each level into lowpass (L) and highpass (H) components, and further recursively over the previous level's L component. In one (preferred) embodiment, a Haar basis can be used for wavelet decomposition along the temporal axis; however, other wavelet schemes are also possible for this unit. In this preferred case, a T-level decomposition would require a temporal block of length $2^T$ frames. In practice, the value of T should not be high (e.g. 1-3). Regardless of the number of levels, we denote the final (coarsest) pair of decompositions L* and H* (each being a 2D array); H* is then (optionally) subjected to a certain thresholding operation, leaving a binary image of moving outlines. In an alternative embodiment, this temporal hierarchical decomposition can be further leveraged, by performing optional analogous thresholding operations to earlier H components, thus providing outlines of faster moving objects/parts, and thereby a measure of temporal flexibility and scalability.

Unit that further performs, using the said L* array/image as input, a standard multi-level spatial DWT-based dyadic decomposition/compression, into 4 bands per spatial level; this creates on each level the standard LL, LH, HL and HH bands (i.e., 2D arrays), the last 3 considered "high-frequency", and the first "low-frequency" bands; on the final (coarsest) level, consistent with 220, these bands are denoted LL*, LH*, HL* and HH*. In practice (or one embodiment), the number of spatial levels—while naturally also dependent on the initial resolution of the image—should be kept such that it enables retaining the basic features of the objects being sought (e.g. basic outlines and poses of the human figures under observation). Analogously to 220, in an alternative embodiment, this spatial hierarchical decomposition can be further leveraged, by performing optional analogous thresholding operations to earlier H components, thus providing coarser outlines of static objects, and thereby a measure of spatial flexibility and scalability.

Conceptually separate integration module, where the 3 high-frequency bands are first (optionally) subjected to a certain thresholding operation; it then connects (superimposes) these 3 high-frequency bands into a single outline image, leaving a binary image of static outlines to be later transmitted further to base station 500; finally, it further superimposes onto this the said H* array, adjusting for common spatial resolution as needed. The resulting outline view 2D array will (in one embodiment tracked here) then contain ternary pixels, displaying (on a black background—assumed without loss of generality) concurrently outlines of static objects (of one gray-white level) and outlines of moving objects (of another gray-white level). All operations described herein should generalize to the alternative multi-level embodiments described within 220 and 240 in a manner obvious to one skilled in the art. Likewise, in another alternative embodiment, the outline view pixels need not be restricted to 3 values, with the added range of "gray" values indicating different motion speed levels Circular (ring) memory buffer where a continuously updated/overwritten compressed full video (of predefined duration $\Delta t$) is stored, by using any standard techniques for quantization and entropy coding of the temporal and spatial L and H bands, hierarchically generated in the units 200-240 described above Base station that receives (via wired or wireless communication—in one embodiment, through a WiFi port) a sequence of outline "ternary" images and performs ongoing automated vision analysis for the purpose of generative decision making, i.e. continuously detecting instances of events of daily living (EDL)); these might belong to more than a single level or type, but will always include the highest, alarm-generating level of EOI (events of interest; primarily in AiP applications: human falls); when an EOI instance is detected, a single-bit signal is sent to camera processor 200 to switch from emitting outline view/video to full (compressed) view; at the same time, such full view compressed video will no longer be recorded in the ring buffer 400, thus enabling preservation of the last $\Delta t$ of full video preceding the EOI (to be accessed subsequently through a separate interface, via unit 900). While the main input of this module in a preferred embodiment is data abstracted from video input, its receiving and integrating functionality is not restricted to that domain, and generalizing it to include other data input (including audio and miscellaneous binary, discrete and continuous-valued sensors—wearable, instrument monitoring or ambient) should be straightforward to one skilled in the art.

In one embodiment, higher-level video analysis modules are based on the widely accepted (e.g., see 2011 Springer book "*Visual Analysis of Humans*") classification of the four main types of activities, specifically: kinesics (movement of people or objects), proxemics (the proximity of people with each other or objects), haptics (people-object contact) and chronemics (change with time). The informal outline of the method is as follows, broadly based on an Hidden Markov Model network (HMM; alternatively—on FSM, CRF or other quantitative inference network; generally—a state machine): Starting with an initial/prior state of scene without humans present and with known inventory and layout of objects present, constantly scan consecutive frames for human presence. Chronemic change of state (CCS) occurs with appearance of humans (1 or more)—either from a predefined physical entry point of known position (e.g. door) or from predefined geometric entry into the frame (e.g. left/right mid-level). Henceforth each human is tracked separately, with their own state machine (though interactions are possible, see later), until a reverse CCS occurs (i.e., human exits the frame). CCS effects apply at all times, for each new entry/exit of human, up to maximum defined simultaneous humans tracked. Humans might appear with one or more predefined objects associated with them (e.g. briefcase, office cart, file binder, cleaners cart, bat, handgun). Tracking-by-detection of humans is standardly performed between frames. Kinesic change of state (KCS) occurs with human reaching a certain new: a) motion speed (stationary, walking running); b) pose, as determined by pose estimation (standing, sitting, bending, laying, waving). Proxemic change of state (PCS) occurs when certain proximity between humans and/or unassociated objects is reached (e.g. desk, computer keyboard, telephone, window, doorknob). Haptic change of state (HCS) occurs with registered human-object contact, henceforth considering the two associated. They remain so until dissociated by a reverse HCS (e.g. depositing a briefcase, hanging up a phone handset).

In more specific basic method outline based on activity events introduced in 510, CCS and KCS detection begin from outline view, indicating outlines of both static and moving objects (the latter possibly with a speed indicator, as defined for module 300). In one embodiment, moving object outlines are piped through a standard Histogram-of-Gradients (HOG) calculation and SVM-like (Support Vector Machine) optimal classification, although other implementations are possible as part of this invention. Results get combined as needed with static outlines. In one embodiment, tracking is based on a recursive Kalman-filter approach of types well known to one skilled in the art, simplified by close temporal frame proximity (high frame rate) and multi-scale representation. PCS detection is based on combining results from moving and static outlines. HCS detection might further employ basic human extremity detection and tracking, based on the same principles used for overall human outlines.

In one embodiment of this invention, EOIs can be programmed to be triggered at any node of the state machine 510 (e.g. falling, running, tailgating, leaving a briefcase/backpack, telephoning, sitting, waving, human group size over a limit) under defined conditions. Probabilities (or equivalent measures of association/likelihood) within the proposed model need to be estimated/measured beforehand (e.g. in the described HMM-based embodiment—prior, transition and conditional probabilities). All such values can be reasonably estimated from both publicly available datasets, and other methods of (un)supervised learning of relevant statistics from new and original footage, in a manner clear to a skilled practitioner of the art.

AAA server with standard authentication, authorization and accounting functionality; these are generally known from the art, as provided (in one embodiment) by the FreeRadius software package.

Client portable device or mobile viewer (possibly to be preceded in the chain by a server entity 550, with certain user account/credential/distribution capabilities typical for servers) that can have the outline video (and full video, following a possible EOI detection) sent to it in real time. This unit is equipped with some suitable dashboard-based user interface (UI), but at a minimum should allow for the said viewing of outline video, and be equipped with an instance of the decoder 900 to facilitate real-time viewing of full video, transmitted in compressed form following an EOI.

Separate network server module than performs classification and indexing of scenes/objects based on results from module 500. As a separate organizational module than performs the following functions: Facilitating secure uploading, management and archiving of users' data files (i.e. data/information supplied from module 500); classification and indexing of events/scenes/objects and enabling effective searches thereupon, in accordance with some of the methods known from the art;

A learning module trained to recognize (or, operate on) units, events and their trends, as defined and indexed in 500 and 700, with the following main goals: a) improving recognition of EOI (on the supervised basis of possible false positives, etc.); b) determining long-term changes in activities of daily living (ADL), as well as gait, stoop, ambulation etc. characteristics of the observed subject(s); c) collecting non-personalized information for a general database tracking ADL and EDL occurrences for monitored subject populations. Analogous to the stipulation made for component 500—while the main input of such a module in the preferred embodiment tracked here is various data abstracted from video input, its functionality is not restricted to that domain, and generalizing it to include other data input (e.g. audio, misc. binary, discrete and continuous-valued sensors) should be straightforward to one skilled in the art.

In another embodiment, [800] a learning module providing "big data analysis", i.e. trained to recognize (or, operate on) units, events and their trends (changes over time), as defined and indexed in 500 and 700, with the following main goals: a) improving recognition of EOI (on the supervised basis of possible false positives, etc.); b) determining long-term changes in activities of daily living (ADL), as well as gait, stoop, ambulation, get-up time and similar characteristics of the observed subject(s); c) collecting non-personalized information for a general database tracking ADL and EDL occurrences for monitored subject populations. Analogous to the stipulation made for component 500—while the main input of such a module in the preferred embodiment tracked here is various data abstracted from video input, its functionality is not restricted to that domain, and generalizing it to include other data input (e.g. audio, misc. binary, discrete and continuous-valued sensors) should be straightforward to one skilled in the art.

Web server (network server proper) that delivers content to (a plurality of) Mobile Viewers 600, as-needed, for a limited time, through standard HTTP protocol and upon submitted request from any such unit.

The decoding/decompression of the video stored in the ring buffer 400 occurs here. This unit can be detached physically, and the point in time when such decompression occurs is independent of the real-time workflow of input signals described above. In one embodiment, it can be attached to or operating as part of mobile viewer 600, for the purpose of viewing full video (FV) footage, either in real time (as might come through BS 500 following an EOI) or subsequently accessing ring buffer 400 with its stored footage directly preceding any such EOI. The present invention is not limited to a fully specific codec (compression-decompression) method, and might encompass all such methods from the class of those DWT-based subband approaches, including both lossless and lorry variants thereof (the JPEG2000 standard most prominent among them); For an example of an implementation of the dyadic n-level DWT decomposition of input; see also Bozinovic et al.: "*A fast DWT-based intermediate video codec optimized for massively parallel architectures*" (U.S. Pat. No. 9,451,291 B1) and other methods well known from the literature.

General Computing Device Structures:

This invention refers to computing programs, applications or software, which are all synonymous and are used interchangeably. This invention can be applied to any computing device that is connected to a communication network or the Internet via wired or wireless connection.

The embodiments of the invention may be implemented by a processor-based computer system. The system includes a database for receiving and storing information from users and application software for users and displaying feedback information.

In accordance with the present invention, computer system operates to execute the functionality for server component; a computer system includes a processor and memory and disk storage. Memory stores computer program instructions and data. Processor executes the program instructions or software, and processes the data stored in memory. Disk storage stores data to be transferred to and from memory. Note that disk storage can be used to store data that is typically stored in the database.

All these elements are interconnected by one or more buses, which allow data to be intercommunicated between the elements. Note that memory is accessible by processor over a bus and includes: an operating system, a program partition and a data partition. The program partition stores and allows execution by processor of program instructions that implement the functions of each respective system described herein. The data partition is accessible by processor and stores data used during the execution of program instructions.

For purposes of this application, memory, flash and disk are machine readable mediums and could include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, flash memory, magnetic disk (e.g., disk and hard drive), optical disk (e.g., CD-ROM), optical fiber, electrical signals, light wave signals, radio-frequency (RF) signals and any other device or signal that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. Further, system may contain various combinations of machine-readable storage devices, which are accessible by processor and which are capable of storing a combination of computer program instructions and data.

A computer system also includes a network interface. Network interface may be any suitable means for controlling communication signals between network devices using a desired set of communications protocols, services and operating procedures. Communication protocols are layered, which is also referred to as a protocol stack, as represented by operating system, a CBE-communication layer, and a Transport Control Protocol/Internet Protocol (TCP/IP) layer. Network interface may also include connectors for connecting interface with a suitable communications medium. Those skilled in the art will understand that network interface may receive communication signals over any suitable medium such as twisted-pair wire, co-axial cable, fiber optics, radio-frequencies, and so forth.

A typical computer system includes a processor, a memory, disk or flash storage, a network interface, and a protocol stack having a CBE-communication layer and a TCP/IP layer. These elements operate in a manner similar to the corresponding elements for computer system.

Detailed embodiments of the present invention are disclosed; however, the disclosed embodiments are merely exemplary of the invention, which can be embodied in various forms; specific structural and functional details disclosed are not to be interpreted as limiting, but merely as a basis for the claims and as a representative basis for teaching one skilled in the art to variously employ the present invention in virtually any appropriately detailed structure. The title, headings, terms and phrases used are not intended to limit the subject matter or scope; but rather, to provide an understandable description of the invention. The invention is composed of several sub-parts that serve a portion of the total functionality of the invention independently and contribute to system level functionality when combined with other parts of the invention. The terms "a" or "an" are defined as: one or more than one. The term "plurality" is defined as: two or more than two. The term "another" is defined as: at least a second or more. The terms "including" and/or "having" are defined as comprising (i.e., open language). The term "coupled" is defined as connected, although not necessarily directly, and not necessarily mechanically.

Any element in a claim that does not explicitly state "means for" performing a specific function, or "step for" performing a specific function, is not be interpreted as a "means" or "step" clause as specified in 35 U.S.C. Sec. 112, Paragraph 6. In particular, the use of "step of" in the claims herein is not intended to invoke the provisions of 35 U.S.C. Sec. 112, Paragraph 6.

INCORPORATION BY REFERENCE

All publications, patents, patent applications and Internet website addresses mentioned in this specification are incorporated by reference to the same extent as if each individual publication, patent, or patent application was specifically and individually indicated to be incorporated by reference; Related Art, which are also incorporated by reference into this application: U.S. Pat. No. 8,814,811 B2; US Pat. 2014/0247335 A1.

Patent and Published Application References

U.S. Pat. No. 9,916,538 Zadeh; U.S. Ser. No. 10/361,802 Hoffberg; US Publ. Appl. 2014/0201126 Zadeh; US Publ Appl. 2018/0204111 Zadeh; US Publ. Appl. 2019/0087965 Datta.

Non Patent Refs

1. CHAAROUI, et. al.; Continuous Human Action Recognition in Ambient Assisted Living Scenarios Lecture Notes of the Institute for Computer Sciences, Social Informatics and Telecommunications Engineering, 2015.
2. Planinc, et. al., "Computer Vision for Active and Assisted Living" 2016.
3. WANG, et. al., "Grading Image Retrieval Based on DCT and DWT Compressed Domains Using Low-Level Features." J. of Communications, Vol. 10, No. 1, January 2015.
4. DELAC, et. al., "Towards Face Recognition in JPEG2000 Compressed Domain." 2007 IWSSIP & EC-SIPMCS, Slovenia.
5. MANDAL, et. al., "A Critical Evaluation of Image and Video Indexing Techniques in the Compressed Domain." Image and Vision Computing Journal, Vol. 17, Issue 7, pp. 513-529, May 1999.
6. SZU, et. al., "Wavelet Transforms and Neural Networks for Compression and Recognition." Neural Networks, Vol. 9, No. 4, pp. 695-708, 1996.
7. DEBARD, et. al., "Camera-based fall detection using a particle filter." Aug. 25-29, 2015 Conference Paper, 2015 37th Annual International Conference of the IEEE Engineering in Medicine and Biology Society (EMBC), Milan, IT.
8. KHAN, et. al., "Video Analytic for Fall Detection from Shape Features and Motion Gradients." Proceedings of the World Congress on Engineering and Computer Science 2009 Vol. II, WCECS 2009, Oct. 20-22, 2009, San Francisco, Calif., U.S.
9. OHM, et. al., "Interframe Wavelet Coding—motion picture representation for universal scalability." Signal Processing: Image Communication 19 (2004) 877-908.
10. AGGARWAL, et. al., "Human Activity Analysis: A Review." ACM Computing Survey, 43(3): 16; April 2011.

A method to analyze video data comprising: a) using a camera with a computing device with a memory storage and a power source to capture and to store the video data; b) simultaneously compressing and analyzing said video data using Low Level Analysis of contours of static and moving objects within the video data; said compression is wavelet-based decomposition; and said analysis of the video data compares real-time semantic human activity within the video data, whereby the method identifies the specific human activity within the video data; the camera can be wirelessly connected to a base station and communicates through 2-way full duplex connection; the camera can emit and stream outline video data and ternary gray-level images, flat backgrounds, outlines of static objects and outlines of moving objects. The apparatus or method can also have a learning module, which is trained to recognize units and events and trends of said units and said events over time; or to recognize long-term changes in activities of daily living, gait, stoop, ambulation and get-up time; or to recognize long-term changes in audio data and data from binary, discrete or continuous-valued sensors.

A method for processing a video sequence of two-dimensional N×K arrays of numerical values, which are captured on a camera with a computer processor, a memory storage and a power source, comprising: a) simultaneously compressing said video sequence through being encoded and b) Processing via low level analysis to produce salient outline features of moving and static scene objects and humans, whereby the method provides for automated scene analysis of said video sequence; this method can use real-time compression and automated visual analysis of a source video signal of two-dimensional arrays of numerical values.

An apparatus for real-time compression and automated visual analysis of a source video signal comprising: at least one camera, which is connected to a computing device with a memory storage and a power source, to capture and to store the source video signal; said apparatus simultaneously compresses and analyzes said source video signal using Low Level Analysis of contours of static and moving objects within the source video signal; said real-time compression is wavelet-based decomposition; and said automated visual analysis of the source video signal compares real-time semantic human activity, whereby said real-time compression and automated visual analysis identifies a specific human activity within the source video signal; the at least one camera is wirelessly connected to a base station and communicates through 2-way full duplex connection; the at least one camera emits and streams outline video data and ternary gray-level images; or the camera emits and streams ternary gray-level images, flat backgrounds, outlines of static objects and outlines of moving objects.

We claim:
1. A method to process video data comprising:
a. Using a camera with a computing device with a memory storage and a power source to capture and to store the video data;
b. Simultaneously compressing and analyzing said video data using Low Level Analysis of contours of static and moving objects within the video data;

Said compression is wavelet-based;

Said analysis is contour extraction and edge detection; and

Said compression integrates said analysis within workflow of said compression.

2. The method of claim 1 wherein, the camera is wirelessly connected to a base station and communicates through 2-way full duplex connection.

3. The method of claim 1 wherein the camera emits and streams outline video data and ternary gray-level images.

4. The method of claim 1 wherein the camera emits and streams ternary gray-level images, flat backgrounds, outlines of static objects and outlines of moving objects.

5. The method of claim 1, wherein a learning module is trained to recognize units and events and trends of said units and said events over time.

6. The method of claim 5, wherein the learning module is trained to recognize long-term changes in activities of daily living, gait, stoop, ambulation and get-up time.

7. The method of claim 5, wherein the learning module is trained to recognize long-term changes in audio data and data from binary, discrete or continuous-valued sensors.

8. A method for processing a video sequence of two-dimensional N×K arrays of numerical values, which are captured on a camera with a computer processor, a memory storage and a power source, comprising:
  a. Simultaneously compressing said video sequence through being encoded and
  b. Processing via low level analysis to produce salient outline features of moving and static scene objects and humans, whereby the method provides for automated scene analysis of said video sequence;

Said compression is wavelet-based;

Said analysis is contour extraction and edge detection; and

Said compression integrates said analysis within workflow of said compression.

9. The method of claim 8, wherein said method uses real-time compression and automated visual analysis of a source video signal of two-dimensional arrays of numerical values.

10. The method of claim 8, wherein a learning module is trained to recognize units and events and trends of said units and said events over time.

11. The method of claim 10, wherein the learning module is trained to recognize long-term changes in activities of daily living, gait, stoop, ambulation and get-up time.

12. The method of claim 10, wherein the learning module is trained to recognize long-term changes in audio data and data from binary, discrete or continuous-valued sensors.

13. An apparatus for real-time compression and automated visual analysis of a source video signal comprising:
  at least one camera, which is connected to a computing device with a memory storage and a power source, to capture and to store the source video signal;
  said apparatus simultaneously compresses and analyzes said source video signal using Low Level Analysis of contours of static and moving objects within the source video signal;

Said real-time compression is wavelet-based;

Said automated visual analysis of the source video signal compares real-time semantic human activity, Whereby said real-time compression and automated visual analysis identifies a specific human activity within the source video signal.

14. The apparatus of claim 13, wherein the at least one camera is wirelessly connected to a base station and communicates through 2-way full duplex connection.

15. The apparatus of claim 13 wherein the at least one camera emits and streams outline video data and ternary gray-level images.

16. The apparatus of claim 13 wherein camera emits and streams ternary gray-level images, flat backgrounds, outlines of static objects and outlines of moving objects.

17. The apparatus of claim 14, wherein a learning module is trained to recognize units and events and trends of said units and said events over time.

18. The apparatus of claim 17 wherein the learning module is trained to recognize long-term changes in activities of daily living, gait, stoop, ambulation and get-up time.

19. The method of claim 17 wherein the learning module is trained to recognize long-term changes in audio data and data from binary, discrete or continuous-valued sensors.

20. The method of claim 1 wherein said analysis of the video data compares real-time semantic human activity within the video data and whereby the method identifies the specific human activity within the video data.

\* \* \* \* \*